United States Patent [19]

Marten et al.

[11] Patent Number: 5,137,969

[45] Date of Patent: Aug. 11, 1992

[54] MELT EXTRUDABLE POLYVINYL ALCOHOL PELLETS HAVING REDUCED MAXIMUM MELT TEMPERATURE AND REDUCED GEL CONTENT

[75] Inventors: F. Lennart Marten, Macungie; Amir Famili, Schnecksville; James F. Nangeroni, Allentown, all of Pa.

[73] Assignee: Air Products and Chemicals, Inc., Allentown, Pa.

[21] Appl. No.: 402,200

[22] Filed: Sep. 1, 1989

[51] Int. Cl.$^5$ ............................................ C08F 16/06
[52] U.S. Cl. ........................................ 525/56; 264/185; 264/211; 524/317; 524/388; 524/417
[58] Field of Search ................. 524/388, 317, 417; 525/56; 264/211, 185

[56] References Cited

U.S. PATENT DOCUMENTS

| | | | |
|---|---|---|---|
| 3,365,413 | 1/1968 | Monaghan et al. | 260/33.2 |
| 3,409,598 | 11/1968 | Takigawa et al. | 264/185 |
| 3,425,979 | 2/1969 | Monaghan et al. | 260/33.2 |
| 3,607,812 | 9/1971 | Takigawa et al. | 260/296 B |
| 3,742,093 | 6/1973 | Skidmore | 264/349 |
| 3,843,757 | 10/1974 | Ehrenfreund et al. | 264/349 |
| 3,997,489 | 1/1976 | Coker | 260/285 R |
| 4,107,422 | 8/1978 | Salmon | 425/144 |
| 4,119,604 | 10/1978 | Wysong | 260/332 R |
| 4,155,971 | 5/1979 | Wysong | 260/204 |
| 4,156,047 | 5/1979 | Wysong | 428/220 |
| 4,206,101 | 6/1980 | Wysong | 260/23 R |
| 4,215,169 | 7/1980 | Wysong | 428/220 |
| 4,243,629 | 1/1981 | Tramezzani | 264/349 |
| 4,244,914 | 1/1981 | Ranalli et al. | 264/515 |
| 4,267,145 | 5/1981 | Wysong | 264/563 |
| 4,320,041 | 3/1982 | Abe et al. | 264/185 |
| 4,452,750 | 6/1984 | Handwerk et al. | 264/349 |
| 4,469,837 | 9/1984 | Cattaneo | 524/388 |
| 4,493,807 | 1/1985 | Vyvial et al. | 264/185 |
| 4,611,019 | 9/1986 | Lutzmann et al. | 524/169 |
| 4,672,087 | 6/1987 | Miller et al. | 524/141 |
| 4,753,760 | 6/1988 | Kawaguchi et al. | 264/185 |
| 4,822,547 | 4/1989 | Derrick | 264/169 |

FOREIGN PATENT DOCUMENTS

| | | | |
|---|---|---|---|
| 712071 | 6/1965 | Canada | 264/185 |
| 48-42950 | 12/1973 | Japan | 264/185 |
| 50-095053 | 6/1975 | Japan . | |
| 50-095054 | 6/1975 | Japan . | |
| 53-71168 | 6/1978 | Japan | 264/185 |
| 55-15885 | 2/1980 | Japan | 264/185 |
| 0202247 | 11/1984 | Japan | 524/317 |

Primary Examiner—Joseph L. Schofer
Assistant Examiner—J. M. Reddick
Attorney, Agent, or Firm—Michael Leach; James C. Simmons; William F. Marsh

[57] ABSTRACT

A method for extruding polyvinyl alcohol which comprises
  adding sufficient energy to the polyvinyl alcohol to both melt it and essentially eliminate the crystallinity in the melt, and
  simultaneously removing energy from the melt at a rate sufficient to avoid decomposition of the polyvinyl alcohol.

Rapidly cooling the extruded melt reduces the heat history and improves the resulting color of the extrudable polyvinyl alcohol.

20 Claims, No Drawings

MELT EXTRUDABLE POLYVINYL ALCOHOL PELLETS HAVING REDUCED MAXIMUM MELT TEMPERATURE AND REDUCED GEL CONTENT

TECHNICAL FIELD

The present invention relates to melt extrudable polyvinyl alcohol compositions and a method for their preparation.

BACKGROUND OF THE INVENTION

The end use areas of polyvinyl alcohol (PVOH) have been limited despite its excellent strength, adhesive and barrier properties. This limitation is partly due to the fact that vinyl alcohol polymers in the unplasticized state have a high degree of crystallinity and show little or no thermoplasticity before the occurrence of decomposition which starts at about 170° C. and becomes pronounced at 200° C.

The crystallinity of PVOH with a degree of hydrolysis in the 98-99 +mole % range is 30-40% depending on the manufacturing conditions. The higher the heat history experienced by the PVOH resin, the higher the crystallinity as described by K. Toyoshima (*Polyvinyl Alcohol Properties and Applications* edited by C. A. Finch, John Wiley & sons Ltd. London 1973). The crystallinity of 87-89 mole % hydrolyzed PVOH is in the 12-18% range and is fairly independent of the manufacturing conditions used.

The melting of PVOH occurs by first melting the small and less than perfect crystals which melt at a temperature approximately 100°-120° C. lower than that of the perfect crystal. Thus a melt is generated by consecutive melting of crystals having a higher and higher melting point until only the perfect and highest melting crystals remain. These perfect crystals are extremely difficult to melt in an extruder as "particle flow" of these crystals is believed to occur. Particle flow is a phenomena which is widely known in the compounding of polyvinyl chloride and was first reported and described by A. R. Berens and V. L. Folt (Trans. Soc. Rheology 11, 95 (1967)). The theory developed by A. R. Berens et al. and adapted by the present inventors to the case of PVOH would predict that the perfect crystals would flow in the PVOH melt created by the melting of the less than perfect crystals and the amorphous material and remain virtually intact at the outlet of the extruder. The gels observed in the extruded PVOH products have been found to consist of unmelted crystalline areas. The crystals making up these areas are believed to be the perfect crystals and thus those with the highest melting point. Increasing the heat during the extrusion process to melt these perfect crystals would result in the formation of degraded and crosslinked material yielding gels having a structure similar to the crystalline-origin gels, the only difference being the presence of a chemical link instead of a physical one. Gels lead to imperfections in the final product which contribute to increased leakage of gas or liquid through the formed product and significantly reduces the mechanical and physical properties.

Resolution of this extrudability problem has been sought through the use of external plasticizers, such as ethylene glycol, trimethylene glycol, propylene glycol and 2,2,4-trimethyl-1,3-pentanediol (U.S. Pat. No. 3,148,202). However, the use of external plasticizer cannot provide sufficient lowering of the melting point to fully overcome the problem of thermal decomposition without leading to significant loss in physical properties such as tensile strength and elongation. Also, the tackiness of any article produced with high plasticizer levels leads to articles having little or no commercial value. Moreover, the addition of plasticizer contributes little, if anything, to resolving the problem of gels in the final product.

Water based extrusion or molding processes have been suggested to help lower the melting point and disperse the crystalline areas thus rendering a uniform and gel-free melt at a low temperature. This technique in essence forms a high solids solution of PVOH which is then cast into a film from which the moisture is removed through evaporation to form a solid, water-free sheet. This process can also be extended to tubular film blowing to produce a biaxially oriented film. However, the film thickness is limited by the rate by which the water can be removed from the film without the creation of air voids. In addition, the necessarily slow drying step results in the reappearance of crystallinity which may be advantageous depending on the particular application. The films produced in this manner are expensive because of the energy cost required to remove the water from the film and, most importantly, the films are prevented from being utilized in the area of coextruded structures. Further, the technique does not allow for injection molding or blow molding of articles as water removal under these circumstances is extremely difficult if not impossible. Thus, the number of end products which can be produced using the water based technique are extremely limited.

The prior art has addressed the problems associated with the melt processability (extrusion) of PVOH. The majority of the art deals with the use of external plasticizer to reduce the melting point of the polymer for the subsequent forming of a PVOH film. However, the art does not address the problems associated with the time/temperature history of the PVOH. Much like polyvinyl chloride, polyvinyl alcohol can withstand a finite heat history before degradation commences. The degradation is evidenced by a yellowing of the polymer and an increase in gels due to heat induced crystallization and crosslinking. Most attempts at thermal processing have involved the direct extrusion of PVOH into films or other articles in order to avoid prolonging the time at increased temperature. However, operating conditions for most forming operations are generally insufficient to remove gels and produce a uniform melt of the polymer. The result is either poor quality films or limited production runs due to material degradation with time in stagnant zones of the extruder.

U.S. Pat. No. 3,365,413 discloses a process for the blow extrusion of clear water dispersible PVOH tubing. A critical plasticized polyvinyl alcohol composition having a residual acetate content of from 25 to 40 wt % is melted at temperatures in the range of 375° to 425° F. to form a plastic mass having a viscosity within the range of 100 to 20,000 poises. This material is extruded through a ring die and blown while in the plastic state. Upon cooling, a thin wall, continuous, non-tacky film is obtained.

U.S. Pat. No. 3,607,812 discloses a method of manufacturing a PVOH film insoluble in water at a temperature below 40° C. by adding 13 to 5 parts by weight of a polyhydric alcohol plasticizer to 87 to 95 parts by weight of PVOH resin which has a polymerization degree of from 700 to 1500 and a hydrolysis degree of at least 97 mole % and contains less than 0.5 % by weight of sodium acetate, drying the mixture to reduce the moisture content to less than 2 wt % and finally melt extruding the mass into a film with a die heated to temperatures of from 190° to 250° C.

U.S. Pat. No. 3,997,489 discloses PVOH compositions of improved melt flow characteristics obtained by the use of extrusion aids comprising a combination of a low molecular weight hydrocarbon oil or wax and a higher molecular weight ethylene homo or copolymer. The improvement is even more pronounced in the presence of a plasticizer.

U.S. Pat. No. 4,119,604 discloses films prepared by melt extrusion or aqueous casting from compositions consisting essentially of a (i) resin mixture containing a low molecular weight PVOH and a medium molecular weight PVOH, and optionally, a copolymer of vinyl alcohol and an ethylenically unsaturated ester and (ii) as a plasticizer a polyethylene glycol.

U.S. Pat. No. 4,206,101 discloses films which are rapidly and completely soluble in cold water, and which are suitable for use as packaging film in automatic packaging equipment prepared by conventional melt extrusion processes from a composition consisting essentially of 5-20 parts by weight of a polyethylene glycol (having an average molecular weight in the range between 325 and 550) in 100 parts by weight of a partially hydrolyzed low molecular weight PVOH.

U.S. Pat. No. 4,244,914 discloses a process for preparing coupled and coextruded multilayer articles made of thermoplastic materials. Part of the process comprises the steps of (a) feeding, to an extruder connected with a coextrusion head, a PVOH having a high degree of hydrolysis mixed with an aqueous mixture of plasticizing compounds and heated under pressure to bring it to the plastisol state, and (b) subjecting the plastisol PVOH to rapid decompression while simultaneously venting the evolved vapors, before it enters the coextrusion head and while it is at a temperature at least equal to, and preferably higher than, the temperature of the coextrusion head.

U.S. Pat. No. 4,469,837 discloses a thermoplastic composition based on PVOH adapted for thermoplastic molding and extrusion comprising a substantially dry mixture of PVOH with at least one or more solid polyhydroxylated monomeric alcohols.

U.S. Pat. No. 4,529,666 discloses plasticized PVOH containing one or more 1,4-monoanhydrohexitols and/or one or more 1,4-3,6-dianhydrohexitols and its use for the production of composite films by coextrusion, coating, doubling and lamination.

U.S. Pat. No. 4,611,019 discloses the addition of small amounts of selected polyamides or polyesters to plasticized, melt extrudable PVOH homopolymer.

U.S. Pat. No. 4,672,087 discloses formed articles made from PVOH by forming PVOH containing a non-hydroxyl plasticizer in a substantially water-free condition and cooling at a rate sufficiently slow to provide enhanced impermeability.

JP86/095,053 discloses a method for producing PVOH-type polymers with excellent thermostability by incorporating acetic acid, sodium acetate, and a partial alkali metal salt of an organic polybasic acid with a limited $pk_a$ value in a PVOH-type polymer.

JP86/095,054 discloses a method for producing PVOH-type polymers with excellent thermostability by incorporating acetic acid, sodium acetate, and a partial alkali metal salt of an inorganic polybasic acid with a limited $pk_a$ value in a PVOH-type polymer.

SUMMARY OF THE INVENTION

The present invention provides a PVOH composition which is readily melt extrudable. Also provided is a process for the production of such PVOH in the form of essentially gel-free thermoplastic PVOH pellets useful for conventional thermoplastic processing.

The extrudable PVOH composition is obtained by providing sufficient energy to a PVOH which is at least partially crystalline to both melt the PVOH and substantially eliminate the crystallinity to the PVOH melt and simultaneously removing energy from the PVOH melt at a rate sufficient to avoid decomposition of the PVOH melt. [Decomposition is evidenced by a yellowing of the PVOH (more than a light straw color) and/or an increase in gels due to heat induced crystallization and crosslinking.] The melt may then be processed directly into the desired product or article, or extruded into a strand, rapidly cooled and cut into pellets for subsequent thermoplastic processing.

The process affords a clear, essentially gel-free, thermally stable PVOH having a maximum melt temperature (determined by Differential Scanning Colorimetry (DSC)) which is at least 5° C. lower than that of the unprocessed PVOH. The energy input utilized in the process is at least about 0.27 KW hr/kg, and desirably less than 0.6 KW hr/kg, preferably 0.35 KW hr/kg to 0.45 KW hr/kg. (KW hr/kg=kilowatt hours/kilogram PVOH). By separating the melt compounding from the shaping operation one can obtain an extrudable PVOH pellet that subsequently can be shaped into films, sheets, articles and the like that exhibit little decomposition or gels.

In contrast, the prior art only added enough energy to melt the PVOH avoiding excess energy which would lead to decomposition of the PVOH. The present invention adds the necessary energy to melt the PVOH and adds additional energy to shear the areas of crystallinity, but at the same time removes this shearing energy to prevent the melt temperature from exceeding the decomposition temperature. That is to say, the additional energy added to effect the shearing essentially passes through the resin melt eliminating the crystallinity and is removed by cooling the melt, for example via the cooling jacket of the extruder.

The extruder requires intensive mixing elements to provide the requisite shearing energy. The shearing energy generated in a particular zone of the extruder should not be greater than that which can be removed by cooling; otherwise decomposition results.

The PVOH pellets produced are thermally stable and can withstand subsequent melt processing in conventional thermoplastic processing equipment, for example, a single screw extruder. The pellets can be thermoplastically processed (extruded) into essentially gel-free articles without decomposition because the equipment only has to melt the pellets and generate sufficient pressure for the desired forming operation. These operations include, by way of example, extrusion, injection molding, thermoforming, injection blow molding, and tubular film blowing.

DETAILED DESCRIPTION OF THE INVENTION

Suitable polyvinyl alcohols for use in the preparation of the extrudable PVOH and thermoplastic gel-free pellets include PVOH which is 78–100 mole % hydrolyzed, preferably 85–99+mole % hydrolyzed, and possesses a degree of polymerization (DPn) in the range of 200 to 2500. Copolymers of vinyl alcohol and methyl methacrylate consisting of 94–98 mole % vinyl alcohol and 2–6 wt % methyl methacrylate as disclosed in U.S. Pat. No. 3,689,469 are considered suitable equivalents to the vinyl alcohol and vinyl acetate copolymer containing the same mole % acetate units. The polyvinyl alcohol may also contain up to 3–4 mole % of a copolymerized monomer.

The PVOH for processing according to the invention desirably is mixed with plasticizer, dispersing agent and/or an acid.

A plasticizer may be used to improve the flow characteristics of the PVOH. The plasticizer should be compatible with the PVOH and may be a polyhydric alcohol, most preferably glycerol, polyethylene glycol or other hydrophilic compounds known in the art to possess compatibility with the PVOH. Other hydrophilic plasticizers useful in the invention include ethylene glycol, mannitol, pentaerythritol or other polyhydric low molecular weight alcohols, block copolymers of ethylene oxide and propylene oxide, and others known to those skilled in the art. The amount of the plasticizer added to the composition range from 1 to 30 wt %, preferably 2 to 20 wt%, based on PVOH.

The thermal stability of the PVOH can further be improved through the addition of small amounts of a mineral acid, preferably phosphoric acid, to a high intensity mixer in which PVOH and plasticizer may be blended prior to extrusion.

The PVOH can either be low in residual ash (sodium acetate measured as $Na_2O$) or can be treated with a neutralizing mineral acid.

The mineral acid used to neutralize the sodium acetate remaining from the neutralization of the hydrolysis catalyst may suitably be phosphoric acid, sulfuric acid, hydrochloric acid, sulfurous acid or any other strong acid yielding a pH neutral or slightly acidic salt. The amount of acid required should be that which results in a 4 wt % aqueous solution of the pellets having a pH of 5.5–7.0.

The preferred phosphoric acid converts the remaining sodium acetate, which acts as a catalyst for decomposition of PVOH, to acetic acid and disodium monohydrogen phosphate and thus significantly reduces thermal decomposition. However, the phosphoric acid should be added in a specific ratio to sodium acetate or the phosphoric acid itself could contribute significantly to the decomposition. The ratio between moles of sodium acetate and added phosphoric acid is 2:1. Low ash PVOH, which is essentially free of sodium acetate by washing with methanol, in most instances will not need a neutralizing acid addition. Further, the formed acetic acid must be devolatilized during the extrusion operation in order to avoid acid-induced decomposition and foaming at the extruder outlet due to evaporating acetic acid.

The addition of phosphoric acid directly to the mixer and not during the neutralization in the PVOH production process greatly increases the flexibility of the PVOH production facility by eliminating the formation of insoluble sodium phosphates in the processing equipment and the resulting pluggage. It must be emphasized that the addition of only phosphoric acid during the neutralization of the catalyst, which can be sodium hydroxide, sodium methylate, sodium ethylate or the corresponding potassium compounds, used during normal PVOH production results in a product with greatly inferior thermal stability.

Optionally, but advantageously, a dispersing agent such as glycerol mono-oleate is added during the mixing operation. The dispersing agent greatly increases the rate of diffusion and thereby reduces the blending time needed to obtain a uniform blend of the plasticizer, PVOH and phosphoric acid; prevents the formations of lumps during the mixing operation which later can result in the formation of gels due to inadequate plasticizer or phosphoric acid content; and provides for a free flowing powder at all times, greatly facilitating the feeding of the extruder using conventional feeding equipment. The dispersing agent further acts as an internal lubricant preventing any significant buildup of PVOH on the walls or in stagnant areas of the extruder. This significantly reduces the possibility of any PVOH experiencing prolonged residence times leading to the degradation of the PVOH and the formation of gels.

The dispersing agent suitably used is a mono- or diester of glycerol and a $C_6$–$C_{18}$ fatty acid. Fatty esters resulting from the esterification of a $C_6$–$C_{18}$ fatty acid an a low molecular weight polyhydric compound are contemplated as functional equivalents. The fatty esters act as surfactants. Obviously, other dispersing agents may also be used.

The preferred range of glycerol mono-oleate or other dispersing agents added during the high intensity mixing is 0.5 wt % to 1.0 wt %, or more preferred 0.1 to 0.5 wt %.

The extruder used in the melt compounding must be able to provide an energy input of at least about t0.27 KW hr/kg, preferably 0.35–0.45 Kw hr/kg, to the PVOH. The upper, practical limit of energy input would be about 0.6 KW hr/kg because any energy beyond that necessary to melt the PVOH and eliminate crystallinity must be removed as "waste energy". The more energy that passes through the PVOH PVOH and has to be removed the more inefficient the process. Approximately 0.1 to 0.15 KW hr/kg is required to melt (and heat) the PVOH and about 0.2 to 0.3 KW hr/kg is needed to shear the crystalline areas in the melt. The energy input for melting the PVOH may be heat or mechanical energy but with most suitable extruders will be all mechanical energy as will be the shearing energy.

Further, the extruder must be capable of removing the excess energy input not required in the heating, melting and shearing of the PVOH resin. The excess energy is removed through the extruder barrel, extruder screw, or through the evaporation of plasticizer during the devolatilization step. Examples of suitable commercially available extruders include twin screw extruders and Buss Condux kneaders.

The melt compounding extruder is operated at a high rotational screw speed with a number of intensive kneading elements in the screw design in order to generate the required energy input. Additionally, the screw barrels are operated at a temperature lower than the melt temperature of the polymer such that there is a net transfer of heat out of the extruder. The result is a high degree of mechanical energy input into the polymer that is sufficient to eliminate gels or crystalline portions of the polymer melt by shearing any crystalline areas apart. A short residence time in the extruder to reduce the heat history results in a strand of molten PVOH at the extruder exit that is essentially gel-free and clear, i.e. the shorter the time in the extruder the more clear and color-free the product. Quick quenching of the strand further reduces the heat history and improves the resulting color of the polymer pellet.

A preferred commercially available apparatus is the Werner and Pfleiderer twin screw extruder which is a co-rotating fully intermeshing extruder. The screw is designed in a segmented fashion so that a variety of different screw elements can be placed on keyed shafts to achieve the desired degree of mixing for a particular application. Screw elements can vary along the length of the screw, but the two screws must be matched to achieve fully intermeshing surfaces. Generally speaking there are two different types of elements, screw conveying elements and kneading or mixing disks. The screw elements can have either a forward or reverse pitch, while the kneading disks can have a neutral pitch in addition to the forward or reverse pitch. The kneading disks consist of staggered elliptical disks that are offset to achieve an overall conveying pitch. The disks can vary in width from one element to another but are typically of uniform width within an element. In addition to a varied pitch in the kneading blocks, different screw elements can have different conveying pitches. The worker skilled in the art would be able to assemble an appropriate screw to achieve the optimum shear history and conveying efficiency to result in the desired final product.

As can be expected, all of the elements impart different levels of shear history and conveying ability. These can be summarized in the following list of elements and their relative shear intensity.

Greatest Shear—Least Forward Conveying Efficiency
  reverse pitch screw elements
  reverse pitch kneading blocks
  neutral kneading blocks
  forward pitch kneading blocks
  forward pitch screw elements
Least Shear—Most Forward Conveying Efficiency In addition, the wider the kneading disk, the more shear is imparted to the melt. Also the tighter the pitch, the more shear is imparted. All of these factors can be combined by a worker skilled in the art to design a screw to achieve the maximum shear input without thermally degrading the product.

The first step in a preferred method for making extrudable PVOH compositions involves the preparation of PVOH blended with a dispersing agent to produce a granular, free flowing mixture to be fed into a melt compounding extruder. The blend is prepared using a variable speed high intensity mixer equipped with a cooling jacket. PVOH is charged to the mixer and the temperature is allowed to rise to approximately 55° C. before the glycerol mono-oleate is added to the mixing vessel. Next the liquid plasticizer (glycerol) is injected into the mixing chamber under pressure through a spray nozzle once 70° C. is reached. The nozzle serves to atomize the plasticizer and eliminates lumping of the PVOH. During the addition of the plasticizer, both the cooling jacket temperature and the mixer speed are adjusted to maintain the temperature of the mix below 105° C., preferably near 95° C. Advantageously, the required amount of mineral acid, preferably phosphoric acid, is mixed with the plasticizer in a liquid blend.

Other solid or liquid additives, pigments, fillers or stabilizers can be added once the plasticizer addition is complete. The mixing action is continued until a free flowing homogeneous product is achieved. This is generally 4–10 minutes but can vary depending upon the addition rate of the glycerol and the Tg of the PVOH polymer. After a free flowing mix is produced, it is discharged into a cooling blender and the temperature reduced to 30° C. The product is ready for extrusion compounding.

Rather than performing a premixing step, it is more desirable to directly inject the plasticizer (glycerol), mineral acid ($H_3PO_4$) and dispersing agent (glycerol mono-oleate) into the extruder at about the 3 diameter distance downstream from the feed location using the first diameters to heat up the PVOH. Thus, the additives are blended into the PVOH which is then quickly melted, sheared and extruded, avoiding a more prolonged exposure to high heat in a premixer.

The preferred extruder is capable of achieving a high level of mechanical energy input, uniformly distributed throughout the polymer. The mechanical energy input of the screw extruder can be quantified by measuring the specific energy. The specific energy input of a screw extruder is computed from the ratio of the electrical energy, in kilowatts (KW), of the screw mechanical drive to the throughput rate of the polymer (kg/hr). The preferred specific, or mechanical, energy input for the preparation of a homogeneous PVOH melt is greater than about 0.30 KW hr/kg. The extruder must also have cooling capabilities, most preferably jacketing in the barrel sections for heat transfer oil or water. The preferred temperature profile of the PVOH obtained in the different extruder zones is 150°–230° C. depending upon the grade of PVOH, most preferred 170°–220° C. Temperatures less than this result in the appearance of unmelted particles in the strands from the extruder outlet, while temperatures above this range increase the number of gels in the strand and promote degradation of the polymer at the barrel walls.

Finally, the extruder must be capable of removing residual moisture and other residual reaction by-products to prevent foaming of the product at the extruder outlet. The level of vacuum applied at the devolatilization zone of the extruder can range from 760 to 10 torr depending upon the level of moisture and generated acetic acid in the feed polymer and plasticizer.

The pre-blended PVOH resin containing plasticizer and any additives is fed either volumetrically or gravametrically into the feed throat of the screw extruder. The feed area is cooled to prevent premature melting of the polymer in the feed throat. The product is transported into the working zone of the extruder where a melt is generated and sheared by using either mixing pins, kneading blocks, or flight interruptions. Once a melt or fluxed state is achieved, the material is conveyed under the devolatilization section of the extruder.

The remaining section of the screw is used to finish the homogenization of the product by shearing to remove any gels or remaining crystalline material. The material is pressurized by either a conveying section of a screw extruder or a positive displacement gear pump through a single or multiple hole die. The exiting strands are cooled as rapidly as possible to prevent polymer degradation. The strands can be passed over chilled, chrome plated or stainless steel rotating rolls, directed onto a moving chilled belt, or passed through a bath of liquid nitrogen. Once the strands are cooled, they are cut in conventional plastic pelletizers to pellets suitable for further extrusion processes.

The production of a thermoplastic PVOH with excellent tensile strength and flexibility depends upon the addition of a small amount of high molecular weight PVOH (DPn ~1200–2400) to a major component of lower molecular weight PVOH (DPn ~200–1200). The low molecular weight component provides a matrix so the material has a reasonable viscosity at a low enough temperature to permit further extrusion processing such as filming. The higher molecular weight component improves the produce in two ways. First, the tensile strength of the film is improved dramatically. Secondly, the flexibility of the film at room temperature is greatly improved and less sensitive to changes in ambient relative humidity.

However, the production of this blend of PVOH resins is not straightforward. The very broad molecular weight distributions created by blending these two feedstocks together makes the production of a gel free resin suitable for filming quite difficult. If the two products are blended with plasticizer together in a high intensity mixer, the different rates of plasticizer uptake in the blender make for a very soft low molecular weight component and a hard high molecular weight component. Placing this product in an extruder for extrusion compounding, results in the premature melting of a low viscosity low molecular weight component while the higher molecular weight component does not melt and is transported through the extruder in a matrix of low viscosity material. The result is large unmelted particulates or regions of high crystallinity in the final product. Separate blending of the two components only partially relieves the problem since the molecular weight of the components are so different.

A solution to the problem is separate melting zones in an extruder for both the high and low molecular weight components. This can be achieved by using two extruders to melt process both resins, then joining the melt streams in a third extruder or a down stream section of one of the two extruders for a short homogenization section. This process can also be achieved in a single extruder by feeding the high molecular weight component in the initial section of the extruder. Once the melt is achieved, the lower molecular weight component is added to the melt in the extruder. The blend is then kneaded, devolatilized and pressurized through a die. Cooling and pelletizing of the strand remains unchanged.

The PVOH product according to the invention is essentially gel-free, i.e., less than 20 gels/24 in$^2$, preferably <15 gels/24 in$^2$ and most desirably <10 gels/24 in$^2$ as determined by the following test method: a 2 mil thick monolayer film is produced from a given sample of the PVOH pellets using a 24 L/D single screw extruder and an 8-inch coathanger cast film die. A 4-inch by 6-inch area is marked off within the center portion of the film and the gels content is evaluated by optical image analysis using a LeMont Scientific OASYS. Single film thickness is backlit, and image acquired at a working magnification of 2.2×. Five random areas, 33×44 mm, were evaluated for each sheet, for a total analysis area of 72.6 cm$^2$. Individual frames are digitized into 512×480 pixel array with 256 grey levels. Image contrast is enhanced and gels delineated through thresholding. Gels are then counted and measured, and statistical analyses performed using standard software. The final number is given as gels/24 sq. in.

The processed PVOH also possesses a maximum melt temperature as determined by DSC that has been reduced by at lest about 5° C., preferably at least about 10° C., especially for 98-99+ mole % hydrolyzed PVOH and at least about 15° C., especially for 87-89 mole % hydrolyzed PVOH.

In the following examples all parts are parts by weight.

EXAMPLE 1

Seventy-five parts of partially hydrolyzed (87-89 mole %) polyvinyl alcohol (Airvol 205; DPn=550) with an ash content of about 0.45 % was introduced into a high intensity Littleford 180L mixer and the mixer started at 900 RPM. When the material temperatures reached 65° C., a liquid mixture consisting of 9.0 parts of glycerol and 0.62 parts of 85% phosphoric acid was added to the mixture while simultaneously reducing the mixer speed to 450 RPM. Cooling water was added to the mixer jacket and controlled to maintain the product temperature below 100° C. at all times. After the glycerol addition was completed, the PVOH blend was mixed for five minutes until a free flowing blend was formed. The blend was then discharged into a Littleford 400L cooling mixer and the product temperature lowered to 40° C. The resulting mixture was free flowing and free of clumps or degraded material.

This blended PVOH composition was loaded into a volumetric feeder and fed into a 46 mm reciprocating, rotating Buss Condux extruder. The screw was designed to achieve a high degree of mechanical energy input without product degradation. The extruder was a devolatilizing extruder, and a vacuum of 254 torr (10 in Hg) was applied at the vent port located at 7 diameters to remove any residual moisture in the polymer and acetic acid formed from the conversion of sodium acetate to disodium monohydrogen phosphate. The melt temperature of the polymer in the working zone of the extruder was maintained at the upper end of the polymer melting curve as indicated by a Differential Scanning Calorimeter (DSC). Melt temperatures were measured at 183° C., 197° C., and 199° C. Typical operating conditions are listed in Table 1 below.

The product exited the extruder and was immediately cooled below its glass transition temperature to prevent product degradation and crystallization of the polymer that would lead to gel formation during subsequent thermal foaming operations. The strands were cut in a conventional manner into pellets and collected.

TABLE 1

| | |
|---|---|
| Screw Speed | 300 RPM |
| Screw Temperature | 140° C. |
| Barrel Temperatures | |
| 1st zone | 150° C. |
| 2nd zone | 150° C. |
| Production Rate | 21.7 kg/hr |
| Max. Melt Temp. | 201° C. |
| Screw Power | 6.5 KW |
| Specific Energy Input | 0.30 KW hr/kg |

The pellets produced were gel-free, smooth and had a straw color. Extrusion cast films from these pellets were clear and gel free (<10 gels/24 in$^2$).

EXAMPLE 2

The PVOH blend of Example 1 was fed by a loss-in-weight feeder into a 30 mm co-rotating twin screw extruder. The extruder was 30 L/D long and was designed to devolatilize at the 24 diameter position. A vacuum of 127 torr (5 in Hg) was applied at the vent dome. The operating conditions are listed in Table 2.

TABLE 2

| Screw Speed | 350 RPM |
|---|---|
| Barrel Temperatures | |
| 1st zone | 140° C. |
| 2nd zone | 160° C. |
| 3rd zone | 160° C. |
| 4th zone | 160° C. |
| 5th zone | 160° C. |
| Production Rate | 13.7 kg/hr |
| Max. Melt Temp. | 226° C. |
| Screw Power | 4.0 KW |
| Specific Energy Input | 0.29 KW hr/kg |

The exiting strands were cooled on a moving cooling belt until hardened and cut into pellets in a pelletizing extruder. Films extruded from the pellets were clear and free from gels (<10 gels/24 in$^2$).

EXAMPLE 3

A blend similar to Example 1 but comprising 50 parts AIRVOL 205 PVOH (ash~0.5%), 6.8 parts glycerol and 0.46 parts 85% $H_3PO_4$ was fed with a gravametric feeder into a 58 mm co-rotating twin screw extruder. The extruder was 24 L/D long and was designed to devolatilize at the 18 diameter position. A vacuum of 127 torr (5 in Hg) mercury was applied at the vent dome. The operating conditions are listed in Table 3.

TABLE 3

| Screw Speed | 250 RPM |
|---|---|
| Barrel Temperatures | |
| 1st zone | 160° C. |
| 2nd zone | 160° C. |
| 3rd zone | 145° C. |
| 4th zone | 145° C. |
| 5th zone | 145° C. |
| 6th zone | 145° C. |
| 7th zone | 160° C. |
| 8th zone | 160° C. |
| Production Rate | 45.5 kg/hr |
| Max. Melt Temp. | 221° C. |
| Screw Power | 25.0 KW |
| Specific Energy Input | 0.55 KW hr/kg |

The exiting strands were cooled on a moving cooling belt until hardened and cut into pellets in a pelletizing extruder. The resulting films were clear and free from gels (<10 gels/24 in$^2$).

EXAMPLE 4

Fifty parts of AIRVOL 205 polyvinyl alcohol (ash=0.42%) was introduced into a high intensity Henschel 150L mixer and the mixer started at 900 RPM. When the PVOH temperature reached 65° C., a mixture of 3.5 parts of glycerol and 0.44 parts of 85% phosphoric acid was added to the PVOH while simultaneously reducing the mixer speed to 450 RPM. Cooling water was added to the mixer jacket and controlled to maintain the product temperature below 100° C. at all times. After the glycerol mixture addition was completed, the PVOH blend was mixed for five minutes until a free flowing blend was formed. The blend was then discharged into a Paul Abbe Inc. 40L cooling ribbon blender and the product temperature lowered to 40° C. The resulting PVOH composition was free flowing and free of clumps or degraded material.

This material was loaded into a volumetric feeder and fed into the 46 mm reciprocating, rotating extruder described in Example 1. Typical operating conditions are listed in Table 4.

The product exited the extruder and was immediately cooled below its glass transition temperature to prevent product degradation and crystallization of the polymer that would lead to gel formation in subsequent thermal forming operations. The strands were cut in a conventional manner into pellets and collected.

TABLE 4

| Screw Speed | 300 RPM |
|---|---|
| Screw Temperature | 140° C. |
| Barrel Temperatures | |
| 1st zone | 150° C. |
| 2nd zone | 150° C. |
| Production Rate | 21.0 kg/hr |
| Max. Melt Temp. | 216° C. |
| Screw Power | 6.5 KW |
| Specific Energy Input | 0.31 KW hr/kg |

The resulting films were clear and free from gels (<10 gels/24 in$^2$)

EXAMPLE 5

Fifty parts of a high molecular weight 87–89 mole % hydrolyzed polyvinyl alcohol [Airvol 540 (DPn=2200; ash=0.19%)] was introduced into the Henschel high intensity mixer and the mixer started at 900 RPM. When the PVOH temperature reached 65° C. 12.5 parts of glycerol was added to the blender at a slow, steady rate. After the glycerol addition, 0.17 parts of 85% phosphoric acid and 0.25 parts glycerol mono-oleate was added to the PVOH mixture as a processing aid. Cooling water was used to maintain the mixture temperature below 100° C. After the mono-oleate addition was complete, mixing was contained at low speed until a uniform, free-flowing PVOH mixture was produced. The mixture was discharged into the Paul Abbe cooling ribbon blender and cooled to 40° C.

This PVOH mixture was introduced into the 46 mm extruder described in Example 1 and compounded into a homogeneous mass. The compounding extrusion conditions are set forth in Table 1. Melt temperatures were maintained at 215° C. or less. The strands were cooled and pelletized in a manner similar to Example 1. The pellets were smooth, clear, and showed no evidence of any gels or non-uniformities (<10 gels/24 in$^2$).

TABLE 5

| Screw speed | 125 RPM |
|---|---|
| Screw Temperature | 145° C. |
| Barrel Temperatures | |
| 1st zone | 155° C. |
| 2nd zone | 160° C. |
| Production rate | 5.0 kg/hr |
| Max. Melt Temperature | 215° C. |
| Screw Power | 2.8 KW |
| Specific Energy Input | 0.56 KW hr/kg |

EXAMPLE 6

Fifty parts of 99.2 mole % hydrolyzed polyvinyl alcohol (DPn=~900; ash=0.04%) was blended in a high intensity Henschel mixer with 5.56 parts of glycerol and 0.037 parts of 85% phosphoric acid as described in Example 5.

The cooled mixture was fed by a volumetric feeder into a 25.4 mm (1 in) counter-rotating tapered twin screw Kaake extruder. The extruder was vented to the atmosphere at the 6 L/D location. The extrusion conditions are listed in Table 6. The exiting strand was immediately cooled on a three roll film stack and pelletized in a conventional pelletizer. The strands were smooth, clear, and showed no evidence of gels or unmelted material.

TABLE 6

| Screw speed | 125 RPM |
|---|---|
| Barrel Temperatures | |
| 1st zone | 184° C. |
| 2nd zone | 184° C. |
| 3rd zone | 183° C. |
| Production rate | 3.7 kg/hr |
| Max. Melt Temperature | 215° C. |
| Screw Torque | 4300 m-gram = 1.48 KW |
| Specific Energy Input | 0.56 KW hr/kg |

EXAMPLE 7

AIRVOL 205 PVOH (22680 g; ash=0.42%) was added to a high shear mixer and heated to 65° C. before the addition of a mixture of 3093 g of glycerol and 174 g of 85% phosphoric acid. The temperature was controlled to below 100° C. with cooling water and by lowering the mixing speed. The mixture was dropped into a ribbon cooling mixer when free flowing. Pellets were produced using the extruder described in Example 6 and the extrusion conditions listed in Table 7.

TABLE 7

| Screw speed | 210 RPM |
|---|---|
| Barrel Temperatures | |
| 1st zone | 170° C. |
| 2nd zone | 170° C. |
| 3rd zone | 165° C. |
| Die | 165° C. |
| Production rate | 1.62 kg/hr |
| Melt Temperature | 186° C. |
| Screw Torque | 1650 m-grams = 0.35 KW |
| Specific Energy Input | 0.22 KW hr/kg |

Numerous gels and non-uniformities were observed in the strands.

EXAMPLE 8

The same PVOH blend and extruder as Example 7 was utilized according to the conditions indicated in Table 8.

TABLE 8

| Screw speed | 210 RPM |
|---|---|
| Barrel Temperatures | |
| 1st zone | 160° C. |
| 2nd zone | 160° C. |
| 3rd zone | 160° C. |
| Die | 160° C. |
| Production rate | 1.51 kg/hr |
| Melt Temperature | 205° C. |
| Screw Torque | 2400 m-gram = 0.58 KW |
| Specific Energy Input | 0.38 KW hr/kg |

Few, if any, gels were observed in the strands and the produced pellets.

Thus Examples 7 and 8 demonstrate that at least about 0.3 KW hr/kg specific energy input is required to afford an extrudable PVOH.

EXAMPLE 9

AIRVOL 205 PVOH (22700 g; ash=0.26%) was added to a high shear Papenmeyer mixer and heated to 65° C. before the addition of a mixture of 2270 g of glycerol and 110 g of 85% phosphoric acid. The temperature was controlled to below 100° C. with cooling water and by lowering the mixing speed. The mixture was dropped into a ribbon cooling mixer when free flowing. Pellets were produced using a 19 mm (0.75 ), 24 L/D single screw Killion extruder outfitted with a 3:1 compression ratio screw but without mix head. No screen pack was in place during this run.

TABLE 9

| Screw speed | 173 RPM |
|---|---|
| Barrel Temperatures | |
| 1st zone | 155° C. |
| 2nd zone | 195° C. |
| 3rd zone | 180° C. |
| Die | 175° C. |
| Production rate | 7.4 kg/hr |
| Melt Temperature | 163° C. |
| Screw Power | 1.62 KW |
| Specific Energy Input | 0.22 KW hr/kg |

Numerous gels were observed in the blow film produced from the above pellets.

EXAMPLE 10

The same PVOH mix as in Example 9 was fed to a 19 mm (0.75 in), 24 L/D single screw extruder outfitted with a 3:1 compression ratio screw and with a mix head. A screen pack with the following mesh screen in placed 60-100-200-60 was used.

TABLE 10

| Screw speed | 106 RPM |
|---|---|
| Barrel Temperatures | |
| 1st zone | 160° C. |
| 2nd zone | 190° C. |
| 3rd zone | 180° C. |
| Die | 180° C. |
| Production rate | 3.0 kg/hr |
| Melt Temperature | 187° C. |
| Screw Power | 0.43 KW |
| Specific Energy Input | 0.14 KW hr/kg |

Numerous gels were observed in the case film produced from the above pellets.

EXAMPLE 11

A feed consisting of 89.4 wt % AIRVOL 205 PVOH (ash=0.42), 9.89 wt % glycerol and 0.7 wt % phosphoric acid was prepared similar to that in Example 1. The material was fed to the extruder of Example 1. The pellets were cooled and cut in an identical manner. A number of runs were conducted to fully define the operation window for thermally producing gel-free thermoplastic PVOH pellets. The produced pellets were melted and extruded into a thin cast film six inches wide which were used to evaluate the gel content. The results for ten runs are shown in Table 11.

TABLE 11

| RUN | 1 | 2 | 3 | 4 | 5 | 6 | 7 | 8 | 9 | 10 |
|---|---|---|---|---|---|---|---|---|---|---|
| Screw (°C.) | 135 | 180 | 80 | 130 | 130 | 200 | 225 | 120 | 100 | 110 |
| Barrel | | | | | | | | | | |
| 1st zone (°C.) | 150 | 190 | 90 | 110 | 110 | 160 | 225 | 110 | 90 | 100 |
| 2nd zone (°C.) | 180 | 190 | 90 | 195 | 180 | 225 | 230 | 185 | 110 | 170 |
| Die (°C.) | 190 | 190 | 190 | 190 | 190 | 190 | 190 | 190 | 180 | 190 |
| Melt (°C.) | 191 | 190 | 189 | 220 | 221 | 218 | 219 | 205 | 190 | 214 |

TABLE 11-continued

| RUN | 1 | 2 | 3 | 4 | 5 | 6 | 7 | 8 | 9 | 10 |
|---|---|---|---|---|---|---|---|---|---|---|
| Die Press (PSI) | 494 | 569 | 545 | 456 | 410 | 383 | 414 | 486 | 535 | 504 |
| Screw Speed (RPM) | 100 | 100 | 301 | 300 | 300 | 100 | 100 | 200 | 300 | 308 |
| Screw Power (KW) | 4.0 | 6.0 | 10.2 | 8.4 | 6.0 | 2.5 | 4.3 | 6.7 | 7.0 | 7.4 |
| Rate (kg/hr) | 13.6 | 26.4 | 26.4 | 26.4 | 13.6 | 13.6 | 26.4 | 20 | 13.6 | 19.5 |
| Spec. Energy (KW hr/kg) | 0.30 | 0.23 | 0.39 | 0.32 | 0.43 | 0.19 | 0.16 | 0.33 | 0.51 | 0.38 |
| Gels (#/24 in$^2$) | 70 | 65 | 12 | 12 | 5 | 30 | 40 | 25 | 50 | 8 |

The high number of gels observed in Run 1 despite a specific energy input of 0.3 KW hr/kg is believed due to degradation of the PVOH caused by the long residence time in the extruder.

EXAMPLE 12

The influence of the phosphoric acid/sodium acetate ratio was investigated. PVOH 1833 g (98.6 mole % hydrolyzed; DP ~1600; ash=0.39%) was added to a high shear mixer and heated to 65° C. before the addition of a mixture containing glycerol (204 g) and various amounts of 85% phosphoric acid. The temperature was controlled to below 100° C. with cooling water and by lowering the mixing speed. The mixture was removed once free flowing. Pellets were produced using a 0.75 inch, 24 L/D single screw extruder outfitted with a 3:1 compression ratio screw without mix head. No screen pack was in place during this trial. The color of the PVOH product was measured by preparing a 4% aqueous solution and measuring the color by means of a Hunter Colorimeter.

TABLE 12

| Run | 1 | 2 | 3 |
|---|---|---|---|
| Phosphoric acid (g) | 4.8 | 8.5 | 17.0 |
| Sodium acetate/phosphoric acid molar ratio | 5.31 | 2.66 | 1.32 |
| APHA color | 237.3 | 42.25 | 60.3 |

It can be seen from the date in Table 12 that when a sodium acetate/phosphoric acid molar ratio of 2.66-1.32 was used during the compounding, the color of the PVOH product was minimized.

EXAMPLE 13

This example illustrates the process for preparing an extrudable PVOH composition comprising a high mol wt PVOH and a low mol wt PVOH in a 46 mm Buss kneader extruder. Blends of Airvol 523 PVOH (87-89 mole % hydrolyzed; DPn=1500) with 27% glycerol and phosphoric acid added to a 1:2 mole ratio with sodium acetate and Airvol 205 PVOH (87-89 mole % hydrolyzed; DP=~550) with 11% glycerol an phosphoric acid are prepared in a Littleford high intensity mixer. The Airvol 523 PVOH blend is added at O L/D location of the kneader and worked for 4 diameters. At the 4 L/D location the Airvol 250 PVOH blend is added to the melt and further mixed. At 7 L/D the blend is devolatilized under 737 torr (29 in Hg) vacuum and discharged at 11 L/D into a positive displacement gearpump for strand die pelletizing. The final ratio of Airvol 205/523 PVOH is 3/1 and the final blend contains 15% glycerol overall. The mixtures are fed to the extruder at a ratio of 76% Airvol 205 PVOH blend to 24% Airvol 523 PVOH blend.

TABLE 13

| Barrel 1st half | 215° C. |
|---|---|
| Barrel 2nd half | 130° C. |
| Screw | 135° C. |
| Melt pump | 185° C. |
| Die | 185° C. |
| Stock Melt at 4 D | 160° C. |
| Stock Melt at 11 D | 190° C. |
| Screw Speed | 310 RPM |
| Screw Torque | 50% |
| Screw Power | 6-7 KW |
| Melt pump | 13.5 RPM |
| Melt pump Torque | 60% |
| Suction Pressure | 0-200 psig |
| Discharge Pressure | 510-630 psig |
| Feed rate (total) | 22.7 kg/hr |
| Specific Energy Input | 0.33 KW hr/kg |

The gels counted in the produced film were 11 gels/24 in$^2$ and the color exhibited was light straw.

EXAMPLE 14

In this example, PVOH's of various degrees of hydrolysis were compounded and melt extruded to yield pellets as described in the previous examples according to the invention. The maximum melt temperatures of the feed material and the pellets were measured by DSC. It can be seen that the maximum melt temperatures of the PVOH pellets were at least about 10° C. lower than that of the PVOH feed.

TABLE 14

| Run | 1 | 2 | 3 |
|---|---|---|---|
| PVOH (mole % hyd) | 98.5 | 88 | 80 |
| Glycerol | 15% | 11.5 | 11 |
| Glycerol Mono-oleate | 0.1 | 0.1 | 0.1 |
| Feed Material | | | |
| Low Melt Pt. (°K.) | 417 | 378 | 368 |
| Max Melt Pt. (°K.) | 508 | 493 | 469 |
| Heat of Fusion (cal/g) | 20.1 | 10.2 | 11.6 |
| Pellets | | | |
| Low Melt Pt. (°K.) | 403 | 394 | 368 |
| Max Melt Pt. (°K.) | 498 | 477 | 459 |
| Heat of Fusion (cal/g) | 14.6 | 8.7 | 8.1 |

Extrudable PVOH pellets that contain less than 20 gels/24 in$^2$ are suitable for making injection molded articles, less than 15 gels/24 in$^2$ are suitable for blow and injection molding operations and less than 10 gels/24 in$^2$ for making films.

STATEMENT OF INDUSTRIAL APPLICATION

The present method provides a PVOH composition which can be readily thermoplastically processed into articles such as films, sheets, containers and the like.

We claim:

1. In a polyvinyl alcohol pellet prepared by melt extruding a feed composition comprising a polyvinyl alcohol and a plasticizer, the improvement which comprises a pellet having a maximum melt temperature that is at least 5° C. lower than that of the polyvinyl alcohol feed composition as determined by differential scanning calorimetry and having less than 20 gels/24 in$^2$ when made into a 2 mil film.

2. The pellet of claim 1 in which the maximum melt temperature is at least about 10° C. lower.

3. The pellet of claim 1 in which the maximum melt temperature is at least about 15° C. lower.

4. The pellet of claim 1 in which the pellet has less than 15 gels/24 in$^2$ when made into a 2 mil film.

5. The pellet of claim 1 in which the pellet has less than 10 gels/24 in$^2$ when made into a 2 mil film.

6. The pellet of claim 1 in which the plasticizer is a polyhydric low molecular weight alcohol.

7. The pellet of claim 1 in which the polyvinyl alcohol feed composition contains residual sodium acetate and to which about one molar equivalent of phosphoric acid is added per two moles of sodium acetate in the polyvinyl alcohol feed.

8. The pellet of claim 1 in which 2 to 20 wt % polyhydric low molecular weight alcohol and 0.1 to 0.5 wt % dispersing agent are added to the polyvinyl alcohol feed composition.

9. In a polyvinyl alcohol pellet prepared by melt extruding a feed composition comprising polyvinyl alcohol and a plasticizer, the improvement which comprises a pellet which has a maximum melt temperature that is at least about 10° C. lower than that of the polyvinyl alcohol feed composition as determined by differential scanning calorimetry and has less than about 15 gels/24 in$^2$ when made into a 2 mil film.

10. The pellet of claim 9 which contains 2 to 20 wt % of polyhydric low molecular weight alcohol as the plasticizer.

11. The pellet of claim 10 in which the polyvinyl alcohol feed composition contains residual sodium acetate and to which about one molar equivalent of phosphoric acid is added per two moles of sodium acetate in the feed polyvinyl alcohol.

12. The pellet of claim 11 which contains 0.1 to 0.5 wt % glycerol mono-oleate.

13. The pellet of claim 1 in which the polyvinyl alcohol is 85-99+ mole % hydrolyzed.

14. The pellet of claim 13 in which the polyvinyl alcohol has a degree of polymerization from 200 to 2500.

15. A polyvinyl alcohol pellet prepared by melt extruding a feed composition comprising an 85-99+ mole % hydrolyzed polyvinyl alcohol having a degree of polymerization ranging from 200 to 2500 and 2 to 20 weight percent of a polyhydric low molecular weight alcohol as a plasticizer, the pellet having a maximum melt temperature that is at least 10° C. lower than that of the polyvinyl alcohol feed composition as determined by differential scanning calorimetry and has less than about 15 gels/24 in$^2$ when made into a 2 mil film.

16. The pellet of claim 15 in which the feed polyvinyl alcohol contains residual sodium acetate and to which about one molar equivalent of phosphoric acid is added per 2 moles of sodium acetate in the feed polyvinyl alcohol.

17. The pellet of claim 16 which contains 0.1 to 0.5 wt % glycerol mono-oleate.

18. The pellet of claim 15 in which the feed polyvinyl alcohol comprises a mixture of a polyvinyl alcohol having a degree of polymerization ranging from 200 to 1200 as the major component of the mixture and a polyvinyl alcohol having a degree of polymerization ranging from 1200 to 2400 as the minor component.

19. The pellet of claim 15 which has less than 10 gels/24 in$^2$ when made into a 2 mil film.

20. The pellet of claim 19 which as a maximum melt temperature that is at lest 15° C. lower than that of the polyvinyl alcohol feed composition which polyvinyl alcohol is 87-89 mole % hydrolyzed.

* * * * *